Oct. 7, 1969 R. M. MAHY ET AL 3,470,970
HYDRAULIC ROCK DRILL
Filed Nov. 24, 1967 3 Sheets-Sheet 1

INVENTORS
RAYMOND M. MAHY &
WILLIAM J. TYLER
BY *Smart & Biggar*
ATTORNEYS

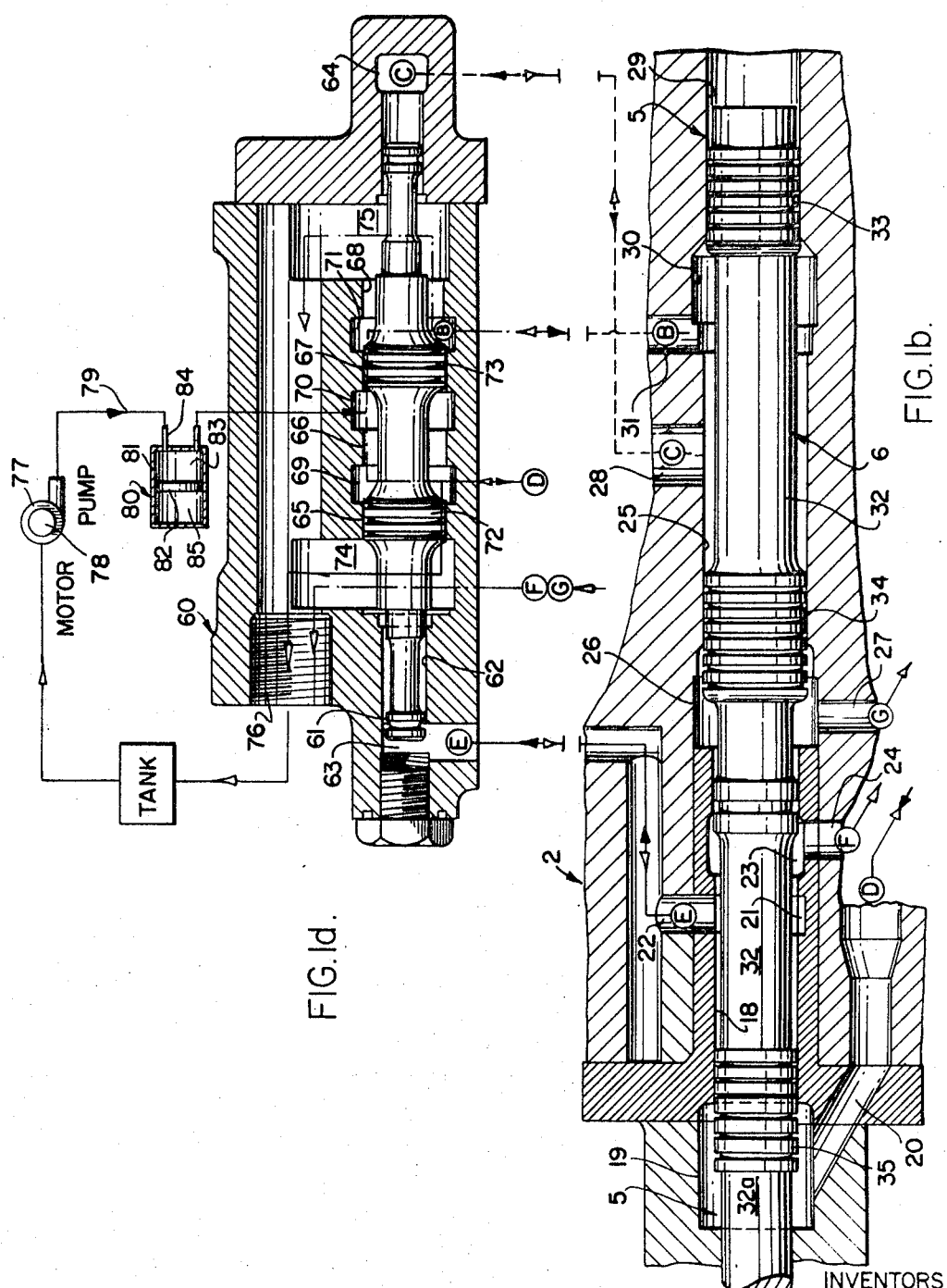

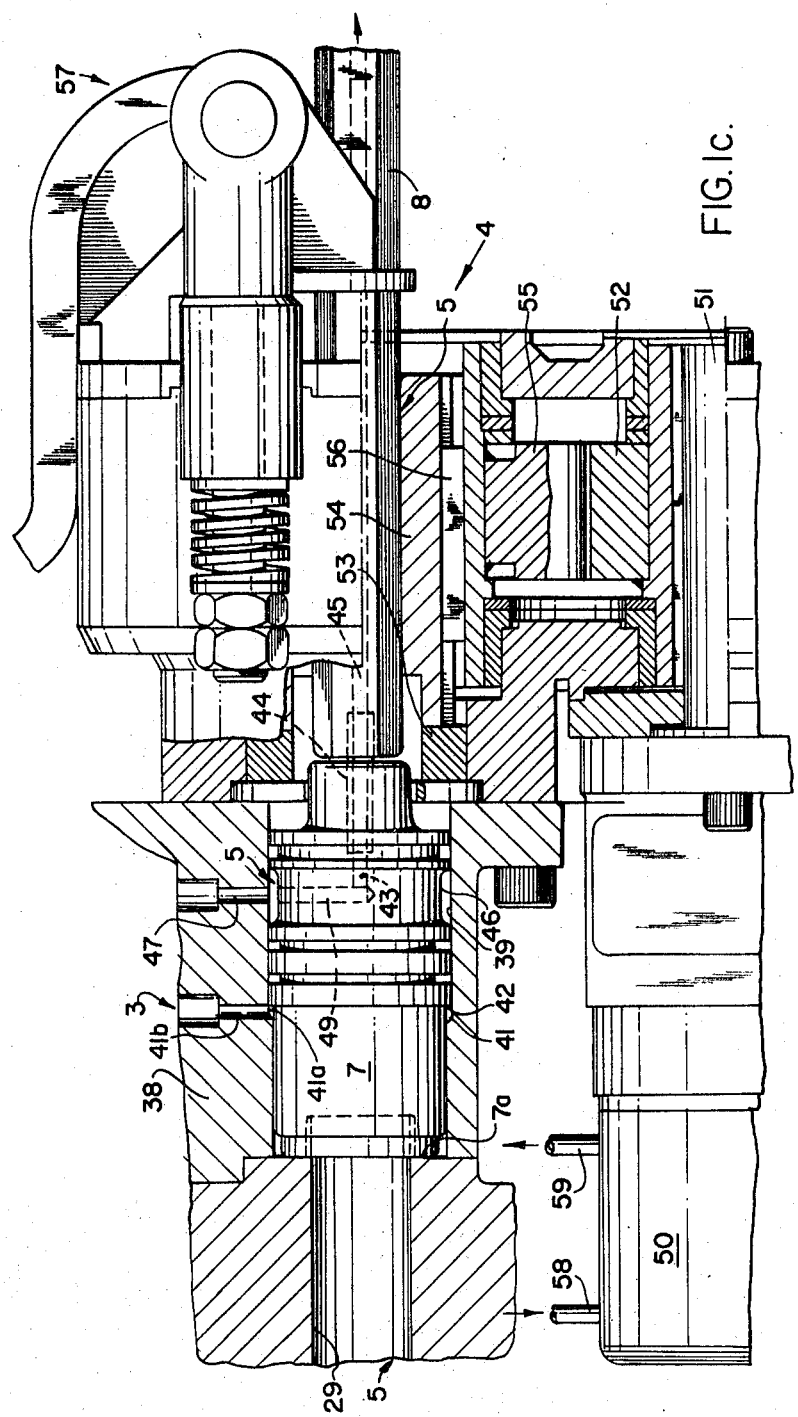

United States Patent Office 3,470,970
Patented Oct. 7, 1969

3,470,970
HYDRAULIC ROCK DRILL
Raymond Marcel Mahy, Lasalle, and William J. Tyler, Valois, Quebec, Canada, assignors to Canada Iron Foundry Limited, Montreal, Quebec, Canada
Filed Nov. 24, 1967, Ser. No. 685,494
Int. Cl. E21c 3/04; B25d 9/04, 9/06
U.S. Cl. 173—105                                12 Claims

ABSTRACT OF THE DISCLOSURE

Reciprocatory percussive equipment is described which comprises a percussive hammer using incompressible fluids as a working medium, a constant flow supply means, and means for eliminating pressure surges in the equipment; particularly described is a rock drill having the reciprocating percussive equipment of the invention and a continuously rotatable drill steel.

BACKGROUND OF THE INVENTION

This invention relates to reciprocatory equipment using incompressible fluids.

Such equipment comprises a longitudinally extending passage and a piston reciprocable in the passage. One end of the piston is adapted to impart a blow to an anvil member or a drill or similar element. Incompressible fluid is caused to act in chambers defined by the passage wall and the piston to reciprocate the piston. The volume of the chambers varies during reciprocation of the piston. It is desirable to apply a force to the piston during a significant portion of its return stroke, and, on the power stroke, over the whole length of this stroke so as to obtain the maximum velocity on impact. This requires that the incompressible fluid be supplied at a substantially constant pressure during the stroke. Since the fluid is incompressible the fluid supply rate must increase during the stroke since the rate of increase of the chamber volume increases as the piston accelerates. If the fluid supply rate does not increase, the pressure in the fluid rapidly decreases to a low value and no force is applied to the piston.

Typically reciprocating equipment of the type being discussed herein has a stroke of three inches and a cycle time of 0.024 second, or 2500 blows per minute. The flow rate required by such equipment typically varies from 115 gallons per minute to zero during each cycle. No pump is available which can provide an output capable of satisfying the rapidly fluctuating requirements of this type of reciprocating equipment.

Reciprocating equipment at present in use uses a pump having a constant rate output approaching the maximum fluid requirement. Since the fluid is incompressible, when the fluid requirement is less than the pump output during a cycle, the pressure in the equipment can build up to pressures of the order of 12,000 p.s.i. when the normal operating pressure is 2,000 p.s.i. This leads to hydraulic hammer because of the inertia and viscosity of the fluid and to damage to equipment including rupture of hoses and connections. Also when the fluid requirement is at a maximum the pump is incapable of fulfilling the requirement and the fluid pressure falls. Also the hydraulic hammer gives rise to pressure fluctuation or waves in the system so that the force on the piston varies even though the system pressure as a whole is high.

It is an object of the present invention to provide reciprocatory percussive equipment which overcomes the above difficulty by reducing the pressure fluctuation in the system and ensuring that the piston is always acted on by correctly pressurized fluid when needed.

SUMMARY OF THE INVENTION

Accordingly, the present invention provides reciprocatory percussive equipment comprising a hammer housing having a longitudinally extending passage therein, a piston reciprocable in said passage, at least two variable volume chambers defined between the piston and the walls of the passage, supply means for supplying incompressible fluid alternately to said variable volume chambers to reciprocate the piston and at a rate to maintain a substantially constant pressure therein during acceleration of the piston, another chamber defined between the passage and the piston, and an energy accumulator, in communication with said another chamber, for absorbing energy from the piston during its stroke in one direction and returning energy to the piston during its stroke in the other direction.

In a preferred arrangement the supply means comprises a constant output pump and a pulsation damper located between the pump and the chambers.

The accumulator serves to absorb some of the energy used in deceleration of the piston on the return stroke and to return it to the piston on the power stroke. This provides acceleration of the piston and reduces the area of the piston which must be subjected to fluid pressure from the pump to obtain the required acceleration. This reduces the maximum output required by the pump and also reduces the magnitude of the pressure fluctuation in the supply means.

The equipment of the invention is suitable for applications wherein a rapid blow rate, each blow having a large force, is required.

Of particular interest is its application in rock drilling equipment having a percussive hammer impacting on a rotatable drill. It has been found that hydraulic hammers have a faster drilling rate and are more efficient than equivalent size pneumatic drills. Further it is economically feasible to use a hydraulic rotary motor for the drill since the hammer uses a hydraulic medium and only one single power source is required.

Accordingly, it is another aspect of the present invention to provide rock drilling equipment comprising, in combination, reciprocatory percussive equipment as defined above, and a drill steel mounting assembly secured thereto so that one end of said piston can impart a blow to a drill steel mounted in said assembly, the drill steel being rotatably mounted in said assembly, said assembly including a rotary motor for rotating the drill steel. In a preferred arrangement a hydraulic motor is used and the exhaust is supplied to the said another chamber.

The combination of the reciprocatory percussive equipment of the invention and the hydraulic rotary motor gives rise to unexpectedly rapid and efficient drilling. This is thought to be due to the fact that the viscosity and inertia of the hydraulic medium prevents immediate rebound of the piston after impact on the drill steel, thus holding the drill against the rock face, and the fact that the hydraulic motor will rotate the drill steel even during impact, so that the rock is ground or broken away during impact as well as during the remainder of the cycle.

BRIEF DESCRIPTION OF THE DRAWINGS

An embodiment of the invention will now be described, by way of example, with reference to the accompanying drawings, in which:

FIGURES 1a, 1b, 1c and 1d are side views, partly in section and partly exploded, which when taken together, illustrate the embodiment of the invention.

DESCRIPTION OF THE PREFERRED EMBODIMENT

Figure 1A:
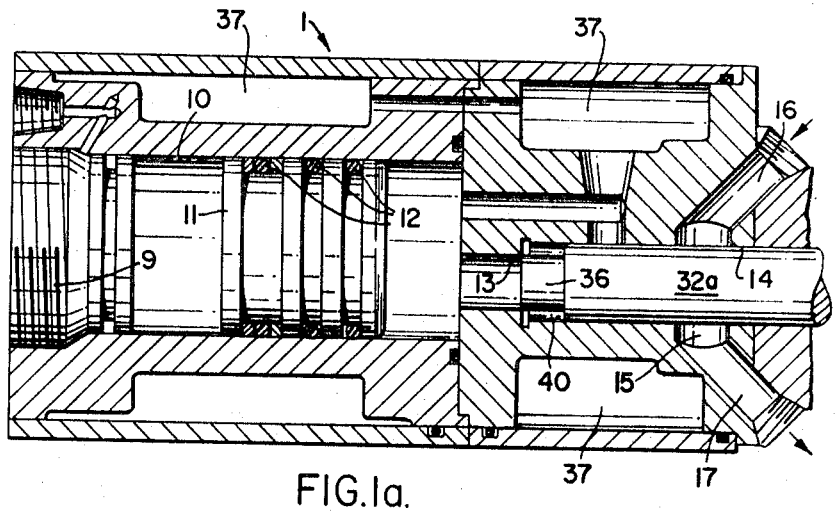

The invention will be described with a reference to a hydraulic rock drill. As shown in FIGURES 1a, 1b and 1c, the drill comprises a number of longitudinally connected parts including an accumulator unit 1, a hammer unit 2, an anvil unit 3, and a rotational unit 4. In a preferred use of the device the hydraulic rock drill is one of a plurality of drills mounted on a jumbo frame or other vehicle and held under pressure by means mounted on the jumbo frame against the rock face. The vehicle frame and the aforesaid means associated therewith are well known in the art and are, therefore, not shown in the accompanying figures.

The parts 1, 2, 3 and 4 are rigidly connected together and are provided in their connected state with a longitudinally extending passage 5. Reciprocally located in that portion of the passage 5 lying in the accumulator unit 1 and the hammer unit 2 is a piston 6; reciprocally mounted in the portion of the passage 5 located in the anvil unit 3 is an anvil 7. Rigidly mounted in the drill rotation unit 4, in a manner to be explained later, is a drill steel 8.

In the accumulator unit 1, the passage 5 is opened out to a large diameter and is closed off from the exterior by a cap 9. The opened out portion 10 forms a cylinder for an accumulator. In the cylinder is an accumulator piston 11 which is grooved and provided with sealing rings 12. Compressed gas fills the space defined between the cap 9 and the piston 11 and is at a pressure of approximately 800 p.s.i. when the volume of the space is at a maximum.

The portion 13 of the passage to the right of the accumulator is of comparatively narrow diameter for a short distance. The passage then widens out as a portion 14 and is provided at 15 with an annular chamber. A passage 16 is bored through the body into the chamber 15 and to this passage is connected a conduit for the exhaust fluid from the rotational unit or from another supply as will be explained later. Extending from the annular chamber 15 is another passage 17 which leads to a hydraulic fluid supply tank.

Beyond the annular chamber 15 the passage 5 again increases in diameter at a portion 18 and between portions 14 and 18 is located a further annular chamber 19 into which a passage 20 in the hammer unit enters. The passage 20 and the chamber 19 will hereafter be referred to as Port D. Also in the portion 18 is an annular chamber 21 and its associated passage 22 which will be referred to as Port E; and beyond chamber 21, further annular chamber 23 and its associated passage 24 which will be referred to as Port F.

Beyond Port F the passage 5 has a still larger diameter portion 25. Between the portions 25 and 18 is an annular chamber 26 from which passage 27 extends. Chamber 26 and passage 27 will be referred to as Port G. Approximately midway along the portion 25 is a passage 28 communicating with the passage 5. Passage 28 and its entrance into the passage 5 will be referred to hereinafter as Port C. The passage 5 has a somewhat smaller diameter portion 29 beyond the portion 25. Located between the portions 25 and 29 is an annular chamber 30 and its associated passage 31. Chamber 30 and passage 31 will hereinafter be referred to as Port B.

The piston ram 6 reciprocates in the portions 14, 18, 25 and 29 of the passage 5. The piston ram 6 has a substantially constant diameter core portion 32 and piston portions 33, 34 and 35. The piston portion 33 reciprocates in the passage portion 29; the piston portion 34 reciprocates in the passage portion 25; and the piston portion 35 reciprocates in the passage portion 18. Each of the piston portions is a close fit in its associated passage portion. The extreme left hand end 32a of the piston ram 6 is a close fit in the passage portion 14. The piston ram has an extension 36 at the left hand end thereof, as seen in FIGURE 1a, which is a close fit in the passage portion 13 for a purpose to be explained later.

The portions of the surfaces of the piston ram 6 which are in cooperative sealing engagement with surfaces of passage 5 are grooved to absorb any oil leakage along the piston and also to provide entrapped oil for lubrication. Around the accumulator and the portions 14 and 13 of the passage 5, there is provided a water jacket 37.

The anvil unit 3 comprises a housing 38 having the passage 5 extending therethrough. The anvil passage portion 39 is of appreciably larger diameter than the passage extending through the hammer unit. Located in the passage portion 39 is the anvil member 7. A face 7a of the anvil abuts a shoulder on the hammer body 2. The passage 39 and the anvil 7 are stepped respectively at 41 and 42 to define a chamber 41a into which pressurized fluid can be supplied through conduit 41b to urge the anvil against the drill steel 8 to prevent or reduce bounce back of the drill steel. The right hand end of the anvil member, as seen in FIGURE 1c, is provided with an axial bore 43. This bore receives, in a press fit, a tube 44 extending into drill steel 8. Provision is made in the anvil for introducing lubricating fluid into the tube and into axial bore 45 extending through the drill steel. The anvil member 7 is provided with an annular groove 46, and a passage 47 passes through the anvil housing in a position such that it is always in communication with the annular groove 46. Extending from the bore 43 to the groove 46 is a radial passage 49. Lubricating liquid may be, therefore, passed continually through the passages 47, 49, 43 and 45 to the working face whatever the position of the anvil in the anvil housing.

The rotational unit 4 is provided to rotate the drill steel continuously during impact thereon of the piston ram 6 via the anvil 7. The unit comprises a rotation motor 50 which has a drive rotor 51. Secured to the rotor 51 is a first gear 52. Rotatably mounted in the portion 53 of the passage 5 which extends through the rotational unit is a sleeve 54 which has an internal cross-section complementary to the cross sectional shape of the drill steel 8. A gear 55 in mesh with the gear 52 is located about the sleeve 54 and is keyed to the sleeve by a key 56. A quick release clamp 57 retains the drill steel in the rotation unit. The rotation motor 50 is of the hydraulic type, that is, it comprises a gear or vane system to which hydraulic fluid under pressure is supplied through conduit 58 to rotate both the gears and the drill steel. It will be understood that the use of incompressible fluid, such as oil, means that the drill steel is continuously rotated whatever the loading on the drill steel as upon a blow from the piston 6. As indicated above, the exhaust fluid from the rotation motor is conducted by a conduit 59 to the inlet passage 16 in the accumulator housing.

Attached to the hammer unit is a valve housing 60. The housing 60 is bored to receive a valve shuttle 61. The valve shuttle 61 cooperates with the piston ram 6 to cause reciprocation of the ram in the passage 5 as will be explained. For simplicity, the valve is shown detached and separate from the unit in FIGURE 1d.

As shown in FIGURE 1, the valve housing 60 has a longitudinally extending bore 62 of varying diameter. Reciprocable in the bore is the valve shuttle 61. At either end of the valve body, as shown in FIGURE 1, are respectively chambers 63 and 64. In the centre of the housing are four sealing surfaces 65, 66, 67 and 68. Located between each adjacent pair of the sealing surfaces are annular chambers 69, 70 and 71. The shuttle 61 is provided with two enlarged portions 72 and 73 which are spaced apart along the shuttle at a distance such that on reciprocation of the shuttle between its extreme positions the chambers 69 and 70 or 70 and 71 are in communication.

On either side of the aforesaid sealing surfaces 65 to 68 are openings 74 and 75 from the bore 62 to a passage 76 which is connected to the supply tank of hydraulic fluid.

Each of the chambers 63, 69, 71, 74, 75 and 64, is in communication by conduits with the ports found in the hammer body and accumulator portions of the passage 5. For ease of understanding, associated chambers and the ports are identified by the same letter. Thus, chamber 63 is identified by the letter E since it communicates with chamber 21 and passage 22 in passage portion 18 in the hammer body. Similarly, chamber 69 is identified by the letter D, chamber 71 is identified by the letter B and chamber 64 is identified by the letter C. The manner in which the chambers and ports are connected by conduits bored in the valve housing 60 and the hammer body 2 will be readily understood by a man skilled in the art.

As already noted, in the assembled state of the rock drill for operational purposes the valve housing is secured to the hammer unit and the rock drill is mounted on a jumbo arm, the face 7a being held against the body 2 to hold the drill bit under pressure against the rock face. A hydraulic fluid pump 77 is driven by a constant speed motor 78 to supply fluid to the drill by means of conduit 79 (see FIGURE 1). In communication with the conduit 79 at a point close to the valve housing 60 is a pulsation damper 80. The pulsation damper 80 comprises a closed cylinder 81 in which a piston 82 is freely slidable. The surface 83 of the piston is in communication with the conduit 79 by means of passages 84. The space 85 in the cylinder is occupied by gas at about 1200 pounds per square inch of charging pressure.

The operation of the rock drill will now be considered.

Oil is pumped under pressure by the pump 77 and passes through the conduit 79 into chamber 70 in the shuttle valve. In the positions shown in FIGURE 1a and 1b, the valve shuttle 61 is at the left hand end of the valve body, and the chambers 70 and 69 are in communication and the chambers 71 and 75 are in communication, the piston ram 6 is at the extreme left hand end of the passage 5 in the hammer unit 2, and the accumulator 1. As will be seen shortly, the valve shuttle 61 has instantaneously arrived at the position shown. Oil flows under pressure into chamber 69 and along the appropriate conduit to Port D. There the fluid acts on the shoulder of the piston portion 35 of the ram 6 to urge the ram on the downfeed or power stroke. The gas in the cylinder 10 of the accumulator 1 has been increased in pressure in the previous cycle as will be seen shortly. On initial movement of the piston ram on the downfeed stroke, the gas expands and exerts a force on the piston 11 pushing the oil contained in the passage portion 13 against the end 36 of the piston ram and also urging the piston ram down the passage 5. When the piston portion 35 passes the Port E just prior to impact on the anvil 7, pressure fluid passes through the Port E to the chamber 63 and moves the valve shuttle to its right hand position in the valve housing 60. In this position fluid pressure is removed from the Port D and is applied through chambers 70 and 71 to Port B. Thus, when the piston ram 6 becomes stationary on impact on the anvil, fluid is applied under pressure immediately to the piston portion 34 to return the piston ram on its upfeed or return stroke after a delay of a few milliseconds. The area of the shoulder of the piston portion 34 is greater than the area of the shoulder of the piston portion 33. When the piston portion 34 passes the Port C, approximately half way up the return stroke, pressure is applied from the Port C to the chamber 64 in the valve housing to return the valve shuttle 61 to its left hand position. Immediately, pressure is applied to the piston portion 35 through Port D to decelerate the piston. After approximately two thirds of the return stroke the left hand end of the piston enters the passage portion 14 and acts on the fluid retained in that passage portion and acting through the fluid moves the piston 11 in the accumulator to compress the gas in the space 10 in the accumulator. This serves to decelerate the piston and to convert the kinetic energy of the piston ram to potential energy in the gas in the accumulator. On entry of the piston end 36 into the passage portion 13 a closed cushion chamber 40 is formed which is filled with fluid and effectively stops the piston in the event of gas pressure failure in the accumulator.

During the return stroke, fluid which occupied the passage portion 18 and Port D is transferred back through the passage 20, chamber 69 and passage 74 to tank. Similarly, during the downfeed stroke, fluid in the passage portion 25 travels back through Port B, chamber 71, and passage 75 to tank. Ports F and G in the hammer body act as drains for fluid evacuated from chambers 63 and 64 respectively. The fluid flows back into the hammer unit through Ports E and C respectively.

Meanwhile, the drill steel 8 is being rotated by the rotation motor 50. Fluid under pressure enters the hydraulic motor through conduit 58 and causes rotation of the shaft 51 and gear 52. Rotation of meshing gear 55 rotates the drill steel through key 56 and sleeve 54. Since the drill steel is axially movable in the sleeve 54, rotation may be continued during impact. The exhaust fluid from the motor is passed through conduit 59 to the passage 16 in the accumulator housing. The exhaust fluid then insures that the passage portion 14 is always full of fluid so that air bubbles cannot be trapped by the piston 6 on its return stroke.

In comparative tests conducted with two types of rock drill, incorporating a hydraulic working medium, and a commonly-used air drill, it was found that the drilling rate of the hydraulic drills was very much greater than the drilling rate of the air drill and that the efficiency of the hydraulic drills was substantially greater than the efficiency of the air drill. Two types of hydraulic drill were used. The first type did not include the accumulator and pulsation damper described above. The second type was in accordance with the description given above. The results of the tests are tabulated below:

POWER REQUIREMENTS

|  | Hydraulic Rock Drill | | Air Drill |
|---|---|---|---|
|  | I | II |  |
| Rotary Motor, H.P. | 7.75 | 7.75 |  |
| Percussion Unit, H.P. | 46.00 | 30.00 |  |
| Total, H.P. | [1] 53.75 | [2] 37.75 | [3] 24.4 |
| On an equivalent speed basis, H.P./inch/minute. | 1.25 | 0.875 | 1.55 |
| Efficiency increase over Air Drill, percent. | 20 | 43 |  |

[1] At a drilling rate of 43 inches per minute.
[2] At a drilling rate of 43 to 48 inches per minute.
[3] At a drilling rate of 14½ inches per minute.

Thus, it will be seen that a drill using hydraulic fluid as a working medium and constructed according to the present invention gives a large improvement over known air drills. The reason for the large improvement is not completely understood. However, it is believed that using a hydraulic medium, the bounce back of the drill steel after an impact is reduced by reason of the viscosity and the inertia of the hydraulic fluid surrounding the piston ram and also due to the pressure being exerted on the piston for several milliseconds after compact. Further, using a hydraulic rotary motor insures that the drill steel rotates during a whole cycle of the percussive unit. Thus the drill steel not only impacts the rock but also tends to grind or break it away continuously.

A further advantage of using hydraulic medium is the reduction of noise. The air drill used in the test generated an exhaust noise of the order of 120 to 130 decibels. It is not possible to silence much of the noise since this absorbs power. In the hydraulic rock drill the medium is not exhausted to atmosphere and there is, therefore, a large reduction in noise. It is estimated that the noise level of the hydraulic rock drill is of the order of 85 decibels. It will be understood that the lowering of the noise level improves personnel efficiency of the order of up to 40%. A further advantage in using hydraulic medium is the reduction in size of ancillary equipment such as compressors. A still further advantage is the extension of drill life. Drills used in the hydraulic rock drill were the same as those used in the air drill. It was found that the life of the drills was extended when used in the hydraulic rock drill and that drilling speeds in the hydraulic rock drill were reduced by less than 10% when the drilling bits became very dull.

It will be apparent from the description which has gone before that during the cycle of the piston ram in the passage 5, varying amounts of hydraulic medium are required as the piston ram accelerates and decelerates. Thus, at the beginning of each stroke when the velocity is slow a small amount of pressurized fluid is required, but when the piston is moving at maximum velocity the amount of fluid required is much larger. Since hydraulic fluids are incompressible, it is necessary to have a supply means which can vary the volume of fluid supplied at a given pressure substantially instantaneously, as the hammer is reciprocating at a rate of approximately 2500 blows per minute. As pointed out, since the fluid is incompressible, or substantially so, the amount of extra fluid which will increase the pressure in the fluid from zero to say 2000 pounds per square inch is very small. It has not been possible to date to design a pump which will give the rapidly fluctuating output required. In the example described herein, the flow requirements vary from zero to 115 gallons per minute during each cycle. Accordingly, in apparatus of this kind a constant flow pump is used which is driven by a constant speed motor. In equipment not using accumulators as in the present invention at instants when no fluid is required then the pressure in the system rapidly builds up to a very high level which can be of the order of 12,000 pounds per square inch or higher. Conversely, when the fluid requirements are high the pressure in the system will reduce to zero. This fluctuation in pressure leads to very strong forces on the hoses and connections in the system and to rupture thereof. It is, therefore, a part of the present invention to incorporate in the hydraulic rock drill means which can provide a constant supply of fluid at approximately the required pressure which may well be of the order of 2000 pounds per square inch. The means in the present apparatus are the pulsation damper 80 and the accumulator unit 1.

In use of the apparatus if the pressure rises in the conduit 79 then the piston 82 is pushed back in the cylinder, compressing the gas and expanding the system volume between the pump and the valve housing. Should the flow requirements be greater than the pump can deliver, then the pressure will tend to drop and the gas expands pushing fluid from the pulsation damper into the circuit so maintaining the pressure and the amount of fluid available.

The accumulator works on a somewhat different principle. Here an auxiliary supply of fluid is used, in this case from the exhaust of the rotary motor although it could, for example, be the drain fluid from the shuttle housing. Thus, when the piston is on the return stroke it pushes oil from the auxiliary system into the accumulator housing 10. On the power stroke when the piston ram is accelerating and increasing its velocity and the amount of fluid required in the passage portion 18 would be large if the whole area of the piston ram was to be subjected to pressure from the Port D, which would be required if it were not for the force derived from the accumulator, the accumulator provides the oil which would have been required.

Figure 2:
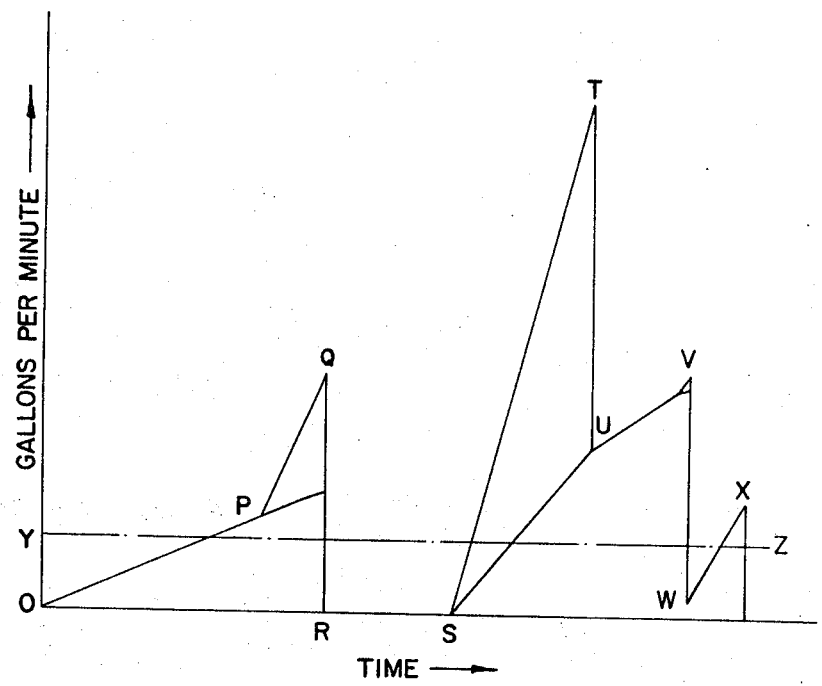
FIGURE 2 is a graph illustrating the operation of the embodiment of FIGURES 1.

To understand the difficulty involved attention is drawn to FIGURE 2. This figure shows the gallons per minute required against time for a percussion device having a stroke of three inches and a complete cycle time of 0.024 second, i.e. 2,500 cycles per minute, and constructed according to the description given above. In the figure, O represents the point in the cycle after impact and just before the piston begins its return stroke. Here the fluid requirement is zero. Between O and P the piston is accelerating and this represents the distance that the piston portion 34 travels between the Port B and the Port C. At the Port C pressurized fluid is required to move the valve shuttle and the flow requirements are increased as can be seen from the portion of the graph from P to Q. Once the shuttle has moved to cut off the flow through the Port B, no further fluid is required as the piston decelerates to the extreme left hand portion of the passage 5. This is represented by the distance R to S. S to T represents the acceleration of the piston when under the force of both the accumulator pressure and the pressure from fluid entering through Port D. It will be seen that the acceleration is fast and the fluid requirements increase. The acceleration is, of course, due to the combination of both forces. The graph illustrates that to obtain this acceleration from fluid supplied by the pump only would represent the rate of 115 gallons per minute as seen at T. However, by using the accumulator and pulsation damper this fluid requirement can be reduced to approximately 35 gallons per minute as shown at U. That area of the graph enclosed by the triangle S, T, U, therefore, represents the flow provided by the fluid trapped by the accumulator which would have had to be provided by the pump to achieve the same acceleration. Thus it will be seen that the accumulator relieves the pump of a large amount of the work required during this portion of the cycle. Thus, the area of the graph under line S, U, represents the actual fluid supplied by the pump and pulsation dampener. From U to V represents the continued acceleration of the piston under the influence of pressurized fluid, from the Port D only, up to impact at the point V. The remaining portion, W, X, represents the fluid requirements to move the valve shuttle, which movement occurs approximately on impact of the piston ram on the anvil.

It will be apparent from the above description that the accumulator augments the fluid delivered from the pump during the initial acceleration of the piston ram on the power stroke. Using the accumulator in this way enables the reduction of the maximum output required from the pump and also enables the use of a smaller pulsation damper. The pulsation damper acts to balance the volume required during the remainder of the cycle thereby reducing pressure surges without loss of energy. The line Y, Z represents the average flow required and this average flow is the constant output from the pump. The areas of the graph above this line are substantially equal to the areas outside the graph below the line Y, Z, excluding, of course, area of triangle S, T, U. The accumulator also improves the efficiency of the device by retaining some of the work used in decelerating the ram on its return stroke and using the retained work to accelerate the piston.

What we claim as our invention is:

1. Reciprocatory percussive equipment comprising a housing having a longitudinally extending passage therein, a piston reciprocable in said passage, at least two variable volume chambers defined between the piston and the walls of the passage, supply means for supplying incompressible fluid alternately to said variable volume chambers to reciprocate the piston and at a rate to maintain a substantially constant pressure therein during acceleration of the piston, another pressurizable chamber defined between the walls of the passage and the piston, and an energy accumulator in communication with said another chamber for absorbing energy from the piston during its stroke in one direction and returning energy to the piston during its stroke in the other direction.

2. Equipment according to claim 1 wherein said supply means comprises a constant volume output pump and conduits connecting said pump to said variable volume chambers, and a pulsation damper in communication with said conduits to absorb fluid from said conduits when the pressure increases and to return fluid to said conduits when the pressure decreases, thereby reducing pressure surges without loss of energy.

3. Equipment according to claim 1 wherein the variable volume chambers are defined respectively between first and second pairs of opposing shoulders formed one in the passage and the other in the piston, and the said another chamber is located at one end of the passage and an end of the piston is reciprocable therein.

4. Equipment according to claim 3 wherein separate supply means are provided for introducing incompressible fluid into said another chamber to maintain the chamber full of fluid, said another chamber having ports therein connected to the separate supply means and open and closable by the end of the piston at points intermediate of the ends of the stroke of the piston.

5. Equipment according to claim 1 wherein the fluid supply to the variable volume chambers is controlled by a shuttle valve in cooperation with the piston, said passage having ports therein in communication with ports in said shuttle valve, the ports n the passage being arranged so that at certain positions of said piston in the passage the supply of pressurized fluid is transferred from one of said variable volume chambers to the other of said variable volume chambers.

6. Equipment according to claim 5 further comprising a constant volume output pump, a conduit extending from the pump to the shuttle valve and a pulsation damper in communication with the conduit.

7. Equipment according to claim 1, wherein the accumulator comprises a cylinder having one end closed, a piston slidable in said cylinder, and gas under pressure in the space defined between said one end and the opposing surface of the piston, the other surface of the piston being in communication with said another chamber.

8. Rock drilling equipment comprising, in combination, reciprocatory percussive equipment according to claim 1, and a drill steel mounting assembly secured thereto so that one end of said piston can impart a blow to a drill steel mounted in said assembly, the drill steel being rotatably mounted in said assembly, said assembly including a rotary motor for rotating the drill steel continuously 9. Rock drilling equipment according to claim 8 wherein said rotary motor is of the constant speed type.

10. Rock drilling equipment according to claim 9 wherein the rotary motor is a hydraulic motor.

11. Rock drilling equipment according to claim 10 wherein the exhaust fluid from said motor is supplied to said another chamber.

12. Rock drilling equipment comprising a drill steel mounting assembly having a drill steel receiving sleeve rotatably mounted therein, a constant speed motor, means interconnecting said sleeve and said motor continuously to rotate said sleeve on rotation of said motor, and reciprocatory percussive equipment secured to said assembly and having a longitudinally extending passage substantially coaxial with said sleeve, a piston reciprocable in the passage, and incompressible fluid supply means connected to said passage and operable on said piston to move the piston in the passage in the direction of said sleeve and to impart a blow to a drill steel in said sleeve whereby during a drilling operation the working end of a drill steel mounted in the said sleeve is held against a rock face and continuously rotated before, during and after a blow from said piston.

References Cited

UNITED STATES PATENTS

| | | | |
|---|---|---|---|
| 2,881,739 | 4/1959 | Huppert | 173—134 |
| 2,919,678 | 1/1960 | Sublett et al. | 173—134 |
| 3,213,615 | 10/1965 | Björnberg | 173—134 |

JAMES A. LEPPINK, Primary Examiner

U.S. Cl. X.R.
173—116, 134, 139